United States Patent
Imajo

(10) Patent No.: US 9,649,964 B2
(45) Date of Patent: May 16, 2017

(54) VEHICLE SEAT

(71) Applicant: TOYOTA BOSHOKU KABUSHIKI KAISHA, Aichi-ken (JP)

(72) Inventor: Taku Imajo, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/883,993

(22) Filed: Oct. 15, 2015

(65) Prior Publication Data

US 2016/0107553 A1 Apr. 21, 2016

(30) Foreign Application Priority Data

Oct. 16, 2014 (JP) .................. 2014-211669

(51) Int. Cl.
*B60N 2/68* (2006.01)
*B60N 2/20* (2006.01)
*B60N 2/64* (2006.01)
*B60N 2/58* (2006.01)

(52) U.S. Cl.
CPC .............. *B60N 2/68* (2013.01); *B60N 2/20* (2013.01); *B60N 2/5816* (2013.01); *B60N 2/64* (2013.01)

(58) Field of Classification Search
CPC ... B60N 2/68; B60N 2/20; B60N 2/58; B60N 2/5816; B60N 2002/5808; B60N 2/5891; B60N 2/64; B60N 2/70; B60N 2/72; B60N 2/56; B60N 2/5621; B60N 2/5642; B60N 2/565; B60N 2/5657
See application file for complete search history.

(56) References Cited

U.S. PATENT DOCUMENTS

| | | | | |
|---|---|---|---|---|
| 7,607,739 B2* | 10/2009 | Browne | ........... | B60N 2/5621 297/180.1 |
| 7,789,462 B2* | 9/2010 | Glover | ............ | B60N 2/2893 297/253 |
| 7,909,405 B2* | 3/2011 | Arima | ............ | B60N 2/20 297/378.12 |
| 8,393,682 B2* | 3/2013 | Hosoda | ............ | B60N 2/366 292/216 |
| 2002/0104190 A1* | 8/2002 | Moore | ............ | B60N 2/2809 16/231 |
| 2012/0133188 A1* | 5/2012 | Wieclawski | ......... | B60N 2/2245 297/378.13 |

FOREIGN PATENT DOCUMENTS

| | | |
|---|---|---|
| JP | 2008-184080 | 8/2008 |
| JP | 2012-158279 | 8/2012 |

* cited by examiner

*Primary Examiner* — Philip Gabler
(74) *Attorney, Agent, or Firm* — Greenblum & Bernstein, P.L.C.

(57) ABSTRACT

A vehicle seat includes: a seat pad; a seat cover that covers a surface of the seat pad; a seat frame that supports the seat pad from an inner side the seat pad; and an assembly component that is assembled into the seat frame through a penetration hole formed in the seat cover. The assembly component is provided with: a bezel that is fixed to the seat frame through the penetration hole from an outer side of the penetration hole, the bezel including an outer frame arranged to cover a periphery of the penetration hole from the outer side; and a backing member that includes an inner frame arranged to cover the periphery of the penetration hole from an inner side of the penetration hole, the backing member being insert-molded in the seat pad.

7 Claims, 9 Drawing Sheets

VEHICLE SEAT

CROSS-REFERENCE TO RELATED APPLICATION

This application claims priorities from Japanese Patent Application No. 2014-211669 filed on Oct. 16, 2014, the entire subject matters of which is incorporated herein by reference.

TECHNICAL FIELD

The present invention relates to a vehicle seat. More particularly, the present invention relates to a vehicle seat including an assembly component which is assembled into a seat frame through a penetration hole formed in a seat cover.

BACKGROUND

Conventionally, a vehicle seat is known in which a rotational operation type lever unit is attached to a shoulder part of a seat back (cf. JP-A-2008-184080). Specifically, the lever unit has a configuration in which a bezel pivotally supporting a lever passes through a penetration hole formed in a shoulder part of a seat back from the outside and is fixed to an inner frame with screws or the like. By this attachment, the bezel is installed in a state in which the periphery of the penetration hole of the seat cover is neatly covered with a frame protruding to the periphery thereof so as not to expose the penetration hole to the outside. The lever unit includes a backing member which is set on the rear side of the seat cover and which is put to the periphery of the penetration hole of the seat cover from the rear side. By this backing member, the lever unit neatly covers the periphery of the penetration hole of the seat cover in a state in which the periphery of the penetration hole of the seat cover is interposed between the bezel and the backing member from the front side and the rear side.

However, in according to the conventional configuration, since both the bezel and the backing member are fixed to the seat frame, the attachment of the lever unit to the vehicle seat may be troublesome.

SUMMARY

The present disclosure has been made in view of the above circumstances, and one of objects of the present disclosure is to provide a vehicle seat having a configuration which allows to simply install an assembly component that is assembled into a seat frame through a penetration hole formed in a seat cover, in a state in which the periphery of the penetration hole is neatly covered.

According to an illustrative embodiment of the present disclosure, there is provided a vehicle seat including: a seat pad; a seat cover that covers a surface of the seat pad; a seat frame that supports the seat pad from an inner side the seat pad; and an assembly component that is assembled into the seat frame through a penetration hole formed in the seat cover. The assembly component is provided with: a bezel that is fixed to the seat frame through the penetration hole from an outer side of the penetration hole, the bezel including an outer frame arranged to cover a periphery of the penetration hole from the outer side; and a backing member that includes an inner frame arranged to cover the periphery of the penetration hole from an inner side of the penetration hole, the backing member being insert-molded in the seat pad.

BRIEF DESCRIPTION OF THE DRAWINGS

In the accompanying drawings:

FIG. 4 is viewed from another angle;

FIG. 6 is viewed from another angle;

DETAILED DESCRIPTION

Hereinafter, embodiments of the invention will be described with reference to the accompanying drawings.

Figure 1:
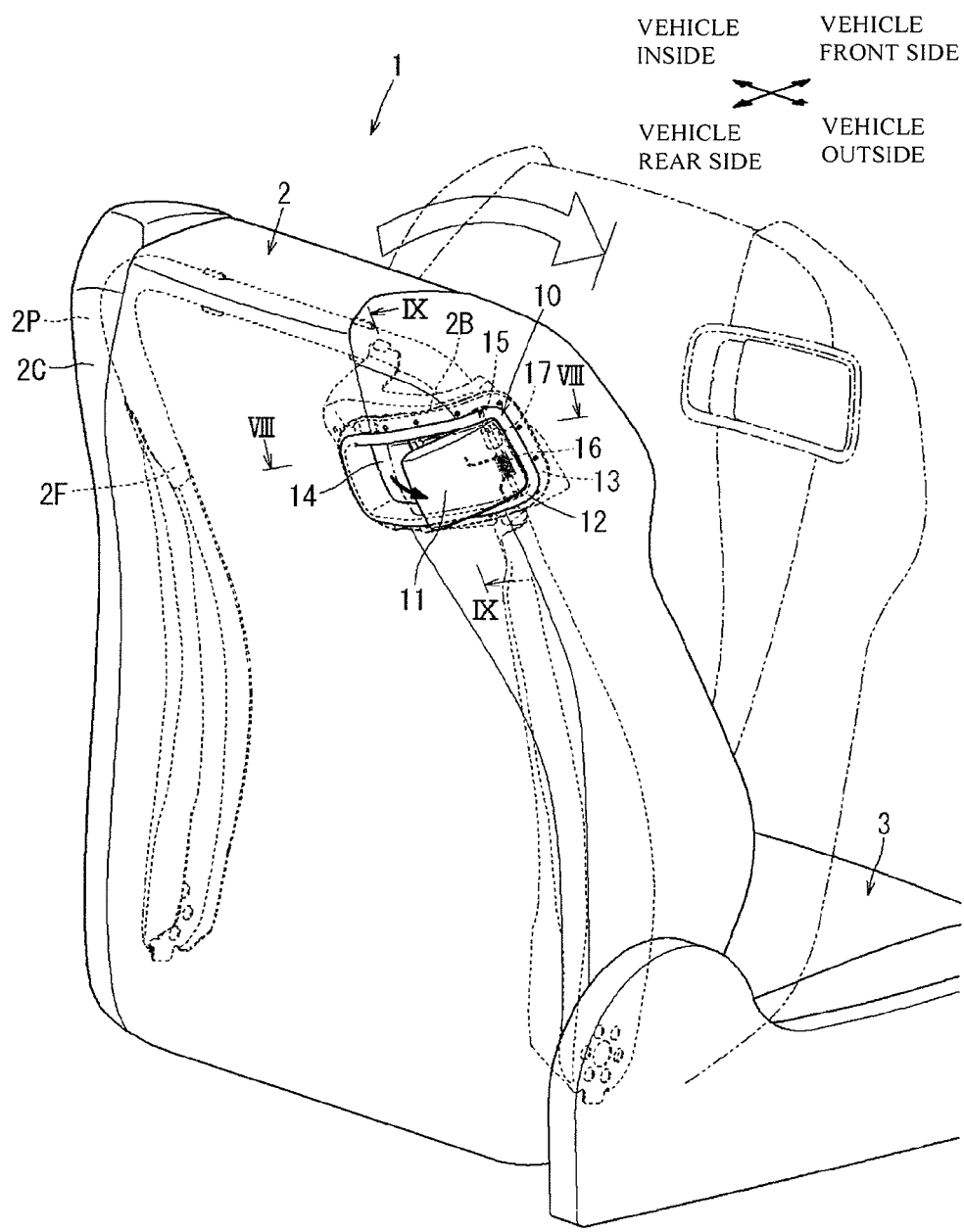
FIG. 1 is a perspective view schematically illustrating a configuration of a vehicle seat according to an embodiment.

A configuration of a seat 1 according to an embodiment will be described with reference to FIGS. 1 to 9. As illustrated in FIG. 1, the seat 1 according to the embodiment is a right seat in a second row of a vehicle including three-row seats. The seat 1 includes a seat back 2 as a backrest of a seated occupant, a seat cushion 3 as a seating portion, and a headrest (not illustrated) serving as a head receiver and a head restraint. The seat 1 has a configuration in which a walk-in lever unit 10 capable of switching the seat 1 to a state in which an occupant can easily get on and off a seat in the subsequent row thereof is disposed in a back surface area of a shoulder joint region on the vehicle outside of the seat back 2. In the embodiment, the walk-in lever unit 10 corresponding to the "assembly component" of the present disclosure.

The walk-in lever unit 10 includes an operation lever 11 which is installed to be flush with the back surface of the seat back 2 and has a rotational operation type lever structure in which the operation lever 11 is operated to rise outward to the vehicle rear side. Since the walk-in lever unit 10 has this operation structure, a user can simply touch and operate the operation lever 11 in a state in which the user stands outside a boarding/alighting door (not illustrated) on the vehicle outside of the seat 1 which has been opened, in a state in which the user sits on a third-row seat, or the like.

The walk-in lever unit 10 releases the fixed state of a backrest angle of the seat back 2 by operating the operation lever 11 to drive a release mechanism (not illustrated). By this release, the seat back 2 is switched to a state in which the seat back 2 can be inclined to the vehicle front side around a connection shaft (not illustrated) to the seat cushion 3 on the bottom side thereof. Accordingly, for example, by applying a pressing force to the vehicle front side to the operation lever 11 with a hand having raised the operation lever 11 to the vehicle outside, the seat back 2 can be simply pushed and inclined to the vehicle front side and can be switched to a state in which the seat back 2 is inclined forward to a predetermined locking position.

Figure 2:
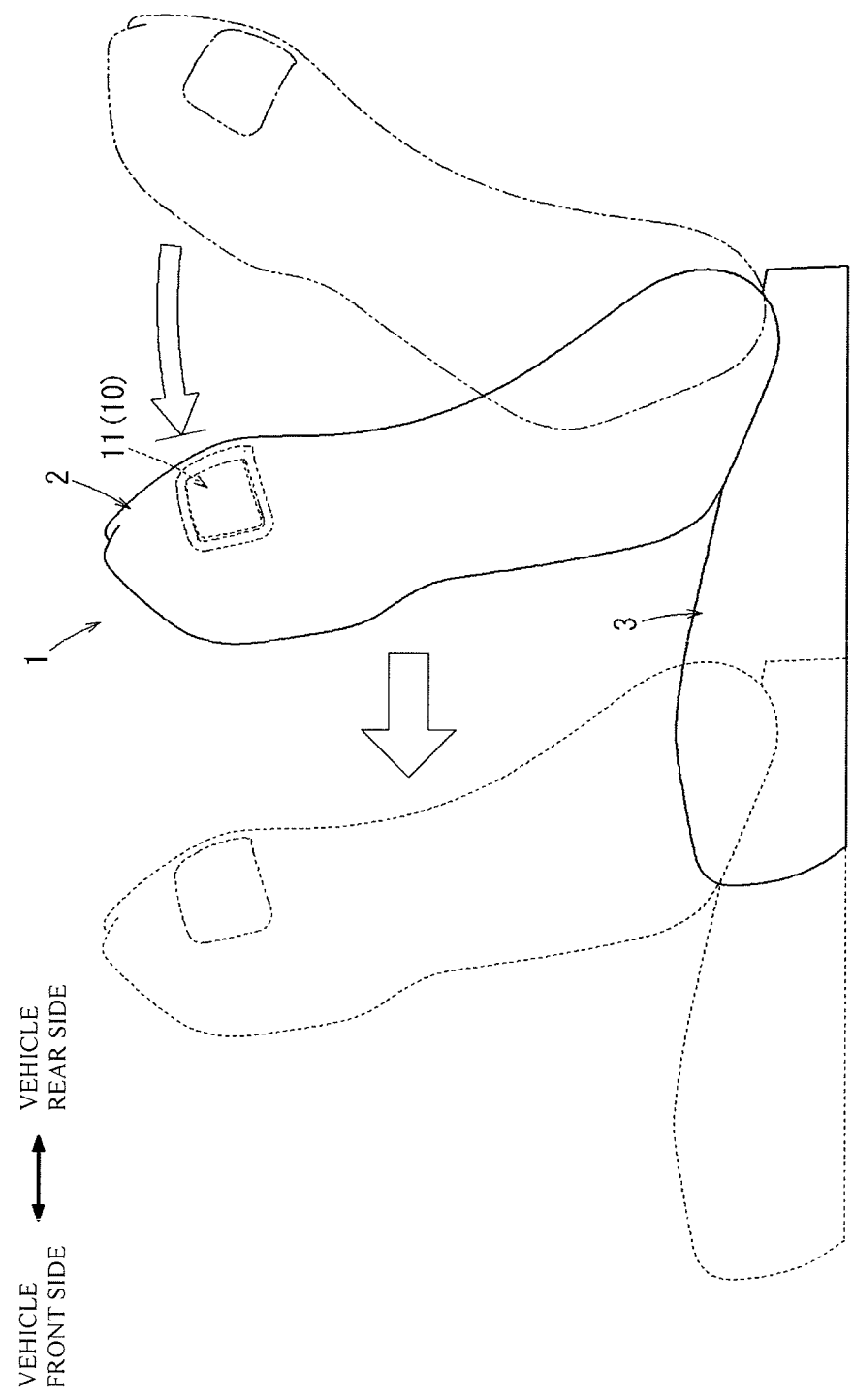
FIG. 2 is a side view illustrating a overview of an operation of the configuration shown in FIG. 1.

In the seat 1, when the seat back 2 is pushed and inclined to the forward-inclined position by the operation of the operation lever 11, a slide lock state of a slide rail (not illustrated) connected in a state in which the seat cushion 3 is slidable forward and backward relative to a vehicle floor is released. Accordingly, as illustrated in FIG. 2, by moving the seat 1, which is in a forward-inclined state in which the seat back 2 is inclined to the forward-inclined position, to retreat to the vehicle front side, a space between the seat 1 and a seat in the subsequent row can be enlarged and a boarding/alighting space for seats in the third row can be enlarged.

The movement that the seat back 2 is inclined to the forward-inclined position by the operation of the operation lever 11 may be performed by a resilient biasing force of a spring (not illustrated) by hooking the spring between the seat back 2 and the seat cushion 3. The movement that the seat 1 retreats to the vehicle front side as a whole after the seat back 2 is inclined to the forward-inclined position may be performed by an electric motor operation which is performed by detecting the movement of inclining the seat back 2 to the forward-inclined position. The mechanism switching the seat back 2 to a state in which the seat back 2 is inclined to the vehicle front side by the operation of the operation lever 11 may be a mechanism releasing a recliner (not illustrated) which fixes the backrest angle of the seat back 2. Alternatively, a switching mechanism (not illustrated: may have a conventional configuration as those described in JP-A-2012-158279) interlocking the seat back 2 with the recliner (not illustrated) or freely rotating the seat back 2 may be disposed and the seat back 2 may be switched to the state in which the seat back 2 is inclined to the vehicle front side by an operation of releasing the switching mechanism.

Here, the seat back 2 includes a back frame 2F which is formed of a metal and which constitutes a framework of the inside, a back pad 2P which is formed of foamed urethane and which is assembled to cover the entire back frame 2F from the seat front side and relaxes and receives an occupant's body pressure, and a back cover 2C which is formed of natural leather and which covers the entire surface of the back pad 2P. In the embodiment, the back frame 2F corresponds to the "seat frame" of the present disclosure, the back pad 2P corresponds to the "seat pad" of the present disclosure, and the back cover 2C corresponds to the "seat cover" of the present disclosure.

The back frame 2F has a configuration which is put together in an inverted U shape forming a framework therein along both the right and left sides and the top side of the seat back 2. In the shoulder part on the vehicle outside of the back frame 2F, a metallic bracket 2B into which the walk-in lever unit 10 is assembled is integrally assembled into the rear side portion thereof by welding.

The back pad 2P is formed by foaming and molding an urethane resin in a form constituting a basic outer shape of the seat back 2. The back pad 2P is assembled to the back frame 2F from the seat upside, widely covers the entire back frame 2F from the seat front side, and is also assembled to widely cover the entire back frame 2F from the upper, lower, right, and left outer periphery sides and from the seat rear side with extension portions which are formed in the upper, lower, right, and left peripheral edges thereof so as to extend in a winding shape to the seat rear side.

Figure 3:
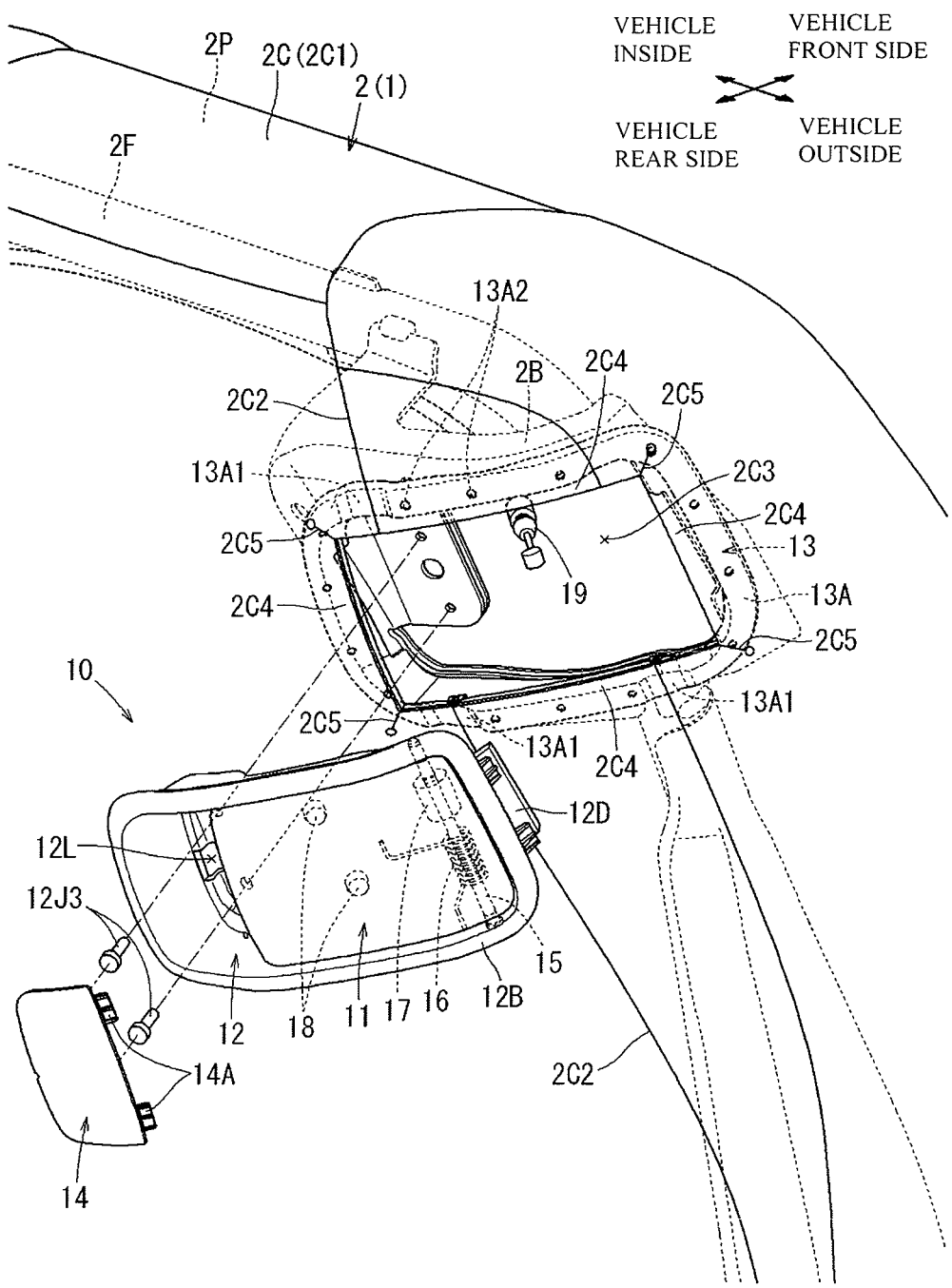
FIG. 3 is an exploded perspective view illustrating a state in which a bezel is removed from a penetration hole of a seat back.
Figure 8:
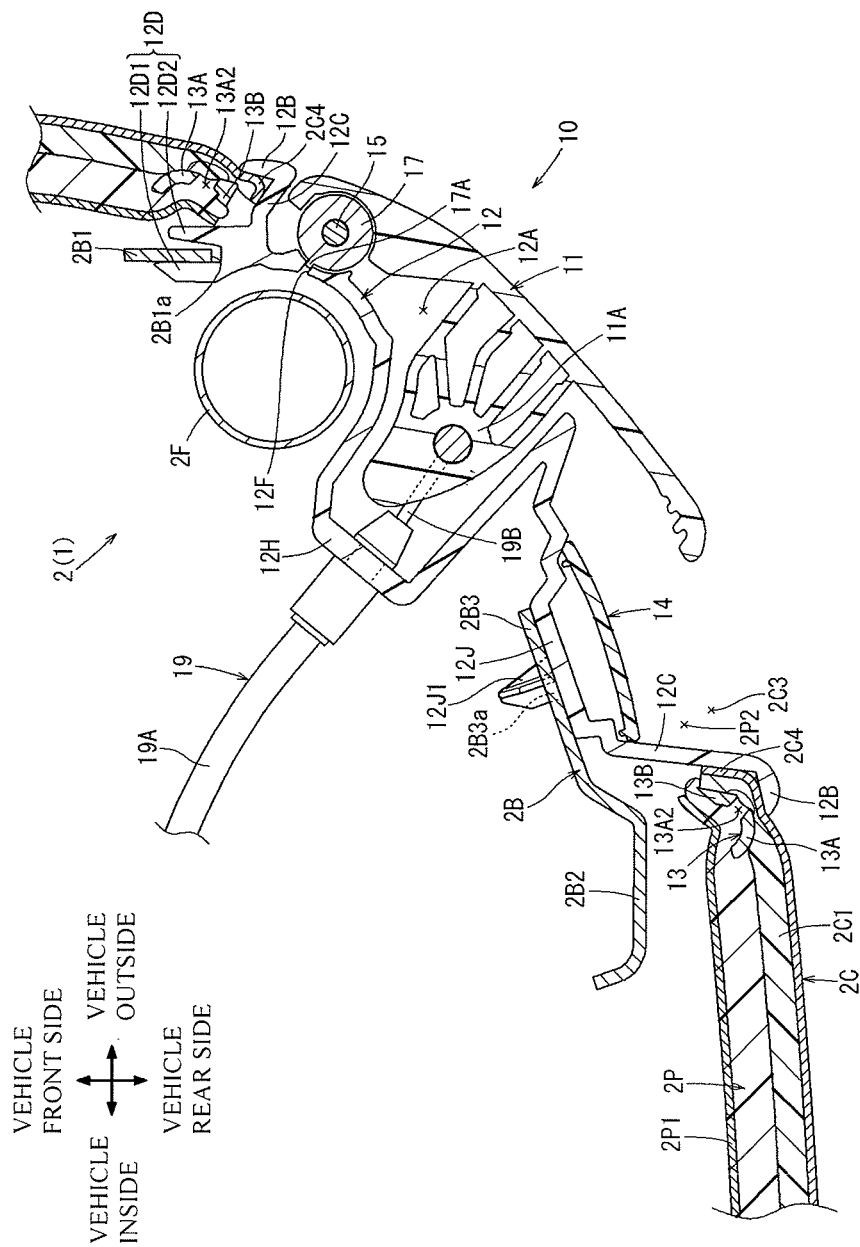
FIG. 8 is a cross-sectional view taken along line VIII-VIII in FIG. 1.
Figure 9:
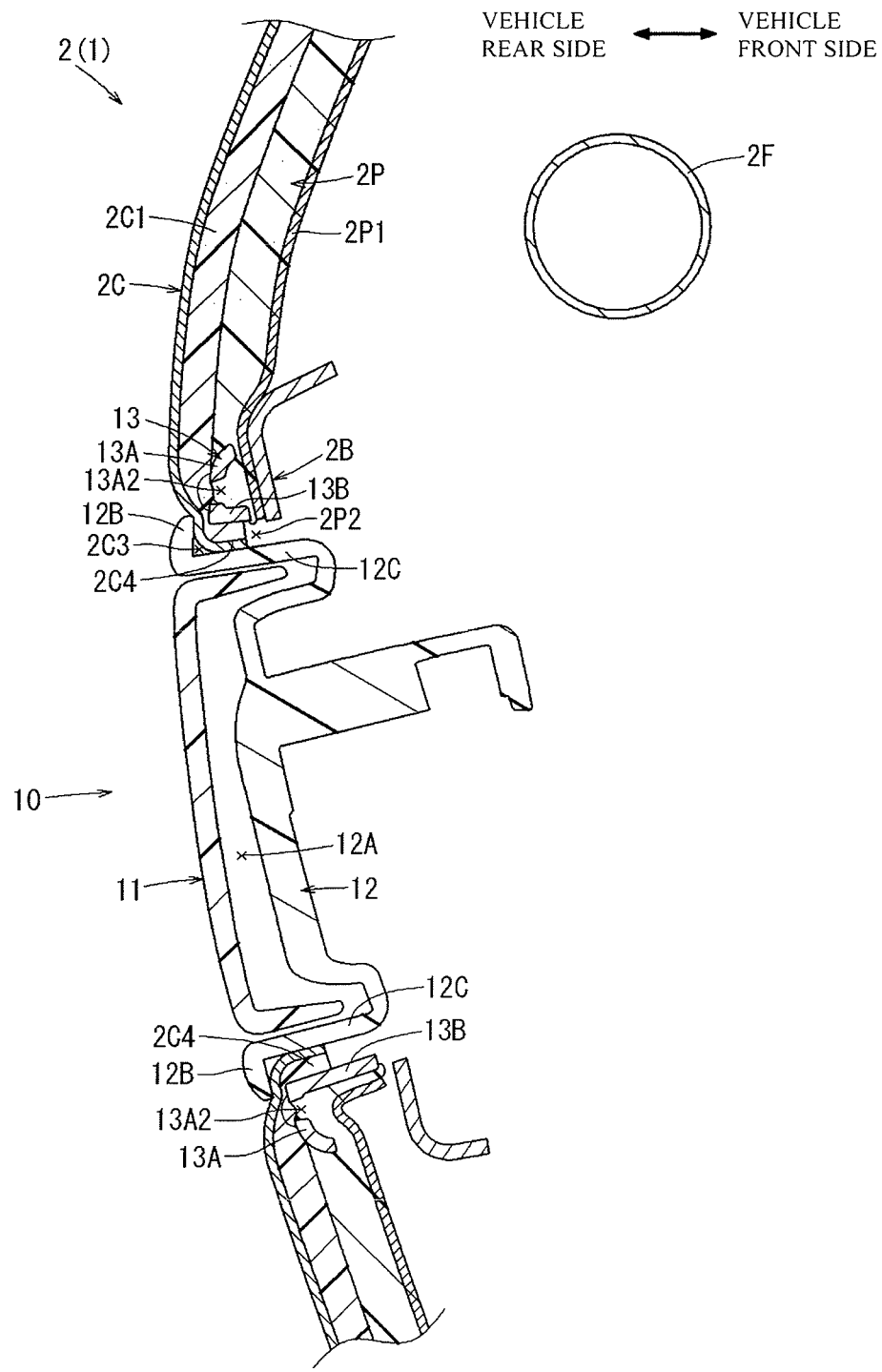
FIG. 9 is a cross-sectional view taken along line IX-IX in FIG. 1.

In the back pad 2P, as illustrated in FIG. 3, FIG. 8 and FIG. 9, a thin backing material 2P1 formed of nonwoven fabric is integrally stacked and installed on the rear surface thereof. The backing material 2P1 is stacked in a state in which the backing material is set in a molding die in foam-molding the back pad 2P, the inside thereof is impregnated with the foamed resin material of the back pad 2P, and both are integrally cured. In this way, since the hard backing material 2P1 is stacked on the rear surface of the back pad 2P, the rigidity of the rear surface of the back pad 2P is improved and the back pad 2P is supported by the back frame 2F with a pressure widely distributed.

The back cover 2C is formed by sewing plural cover pieces, which are cut to correspond to the respective surfaces of the seat back 2, in an envelope shape. Here, each cover piece constituting the back cover 2C has a two-layer structure in which a foamed urethane layer (a laminated pad layer 2C1) having low air permeability is integrally stacked on the rear surface thereof. The back cover 2C is disposed such that the edge portions (sewed portions 2C2) in which the cover pieces are superimposed and sewed protrude to the rear surface side (the side facing the back pad 2P) of the back cover 2C. The back cover 2C is formed in a state in which the laminated pad layer 2C1 on the rear side thereof is thinly impregnated with the foamed resin material of the back pad 2P and both are integrally cured by setting the foamed resin material into a molding die in foam-molding the back pad 2P. Accordingly, the back cover 2C is disposed to be integrally stacked on the surface portion of the back pad 2P.

As illustrated in FIG. 3, in the walk-in lever unit 10, a bezel 12 into which the operation lever 11 is assembled passes through a rectangular penetration hole 2C3, which is formed in a rear surface region of the shoulder part on the vehicle outside of the back cover 2C, from the outside to the inside and is fastened to the bracket 2B exposed to the inside (rear side) of the penetration hole 2C3. Since the walk-in lever unit 10 has a configuration in which the bezel 12 is assembled through the penetration hole 2C3 of the back cover 2C from the outside as described above, an outer frame 12B protruding in a flange shape formed in the outer periphery of the bezel 12 is put to the periphery of the penetration hole 2C3 of the back cover 2C from the front side to neatly cover the periphery of the penetration hole 2C3.

The walk-in lever unit 10 includes a backing member 13 having an inner frame 13A having a frame shape which is put to the periphery of the penetration hole 2C3 of the back cover 2C from the rear side. The backing member 13 is set into a molding die in foam-molding the back pad 2P and is integrally inserted and installed into the back pad 2P. The back pad 2P has no shape in the region in the frame of the backing member 13 and a penetration hole 2P2 communicating with the penetration hole 2C3 of the back cover 2C is formed in the region.

The backing member 13 is formed in a frame shape larger than the penetration hole 2C3 of the back cover 2C. Accordingly, a peripheral edge portion 2C4 facing the penetration hole 2C3 of the back cover 2C protrudes in the frame of the backing member 13. The peripheral edge portion 2C4 of the back cover 2C has slits 2C5 formed at four corners, and the side portions protruding into the frame of the backing member 13 are bent to be folded onto the frame pieces of the backing member 13 without being stretched.

According to this configuration of the backing member 13, the walk-in lever unit 10 can neatly cover the periphery of the penetration hole 2C3 of the back cover 2C from the front and rear sides using the outer frame 12B of the bezel 12 passing through the penetration hole 2C3 of the back cover 2C from the outside and the inner frame 13A of the backing member 13 inserted into the back pad 2P. Specifically, the bezel 12 and the backing member 13 are disposed over a curved corner region between the rear surface of the shoulder part on the vehicle outside of the seat back 2 and a vehicle outside surface. Accordingly, the bezel 12, the backing member 13, and the bracket 2B into which the bezel 12 is assembled are formed in a curve shape along the shape of the curved corner region of the seat back 2.

Figure 4:
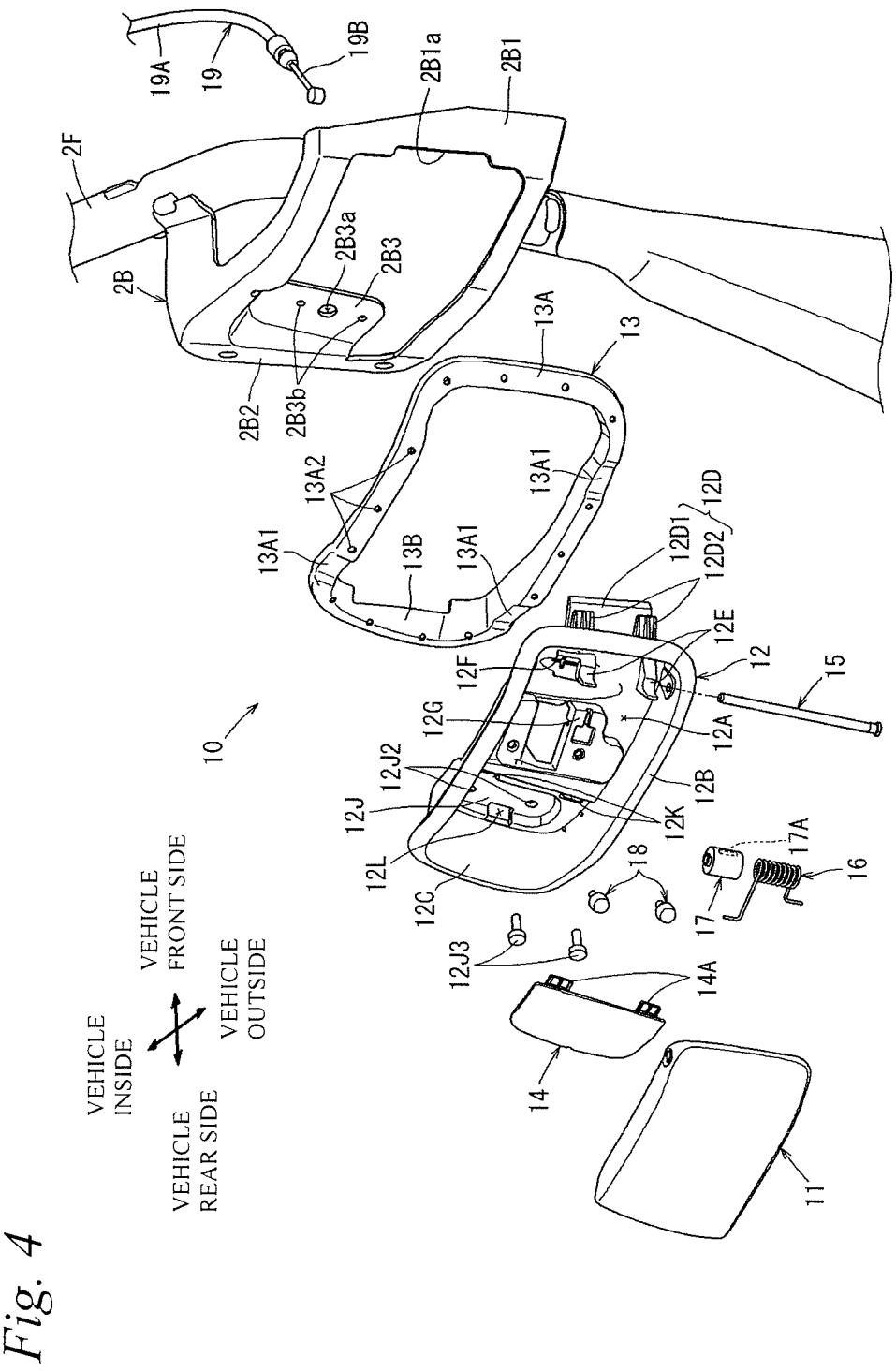
FIG. 4 is an exploded perspective view illustrating a walk-in lever unit.
Figure 5:
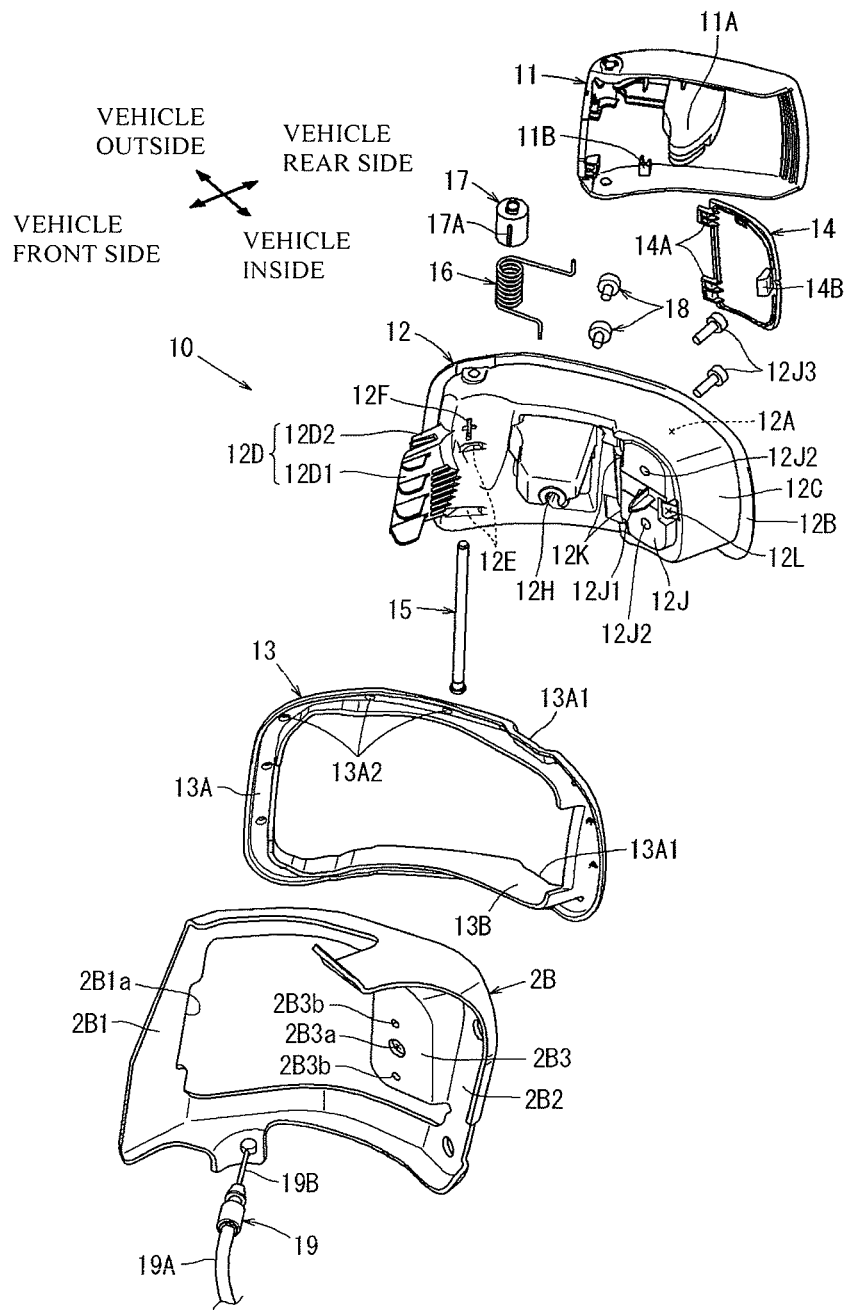
FIG. 5 is an exploded perspective view when
Figure 6:
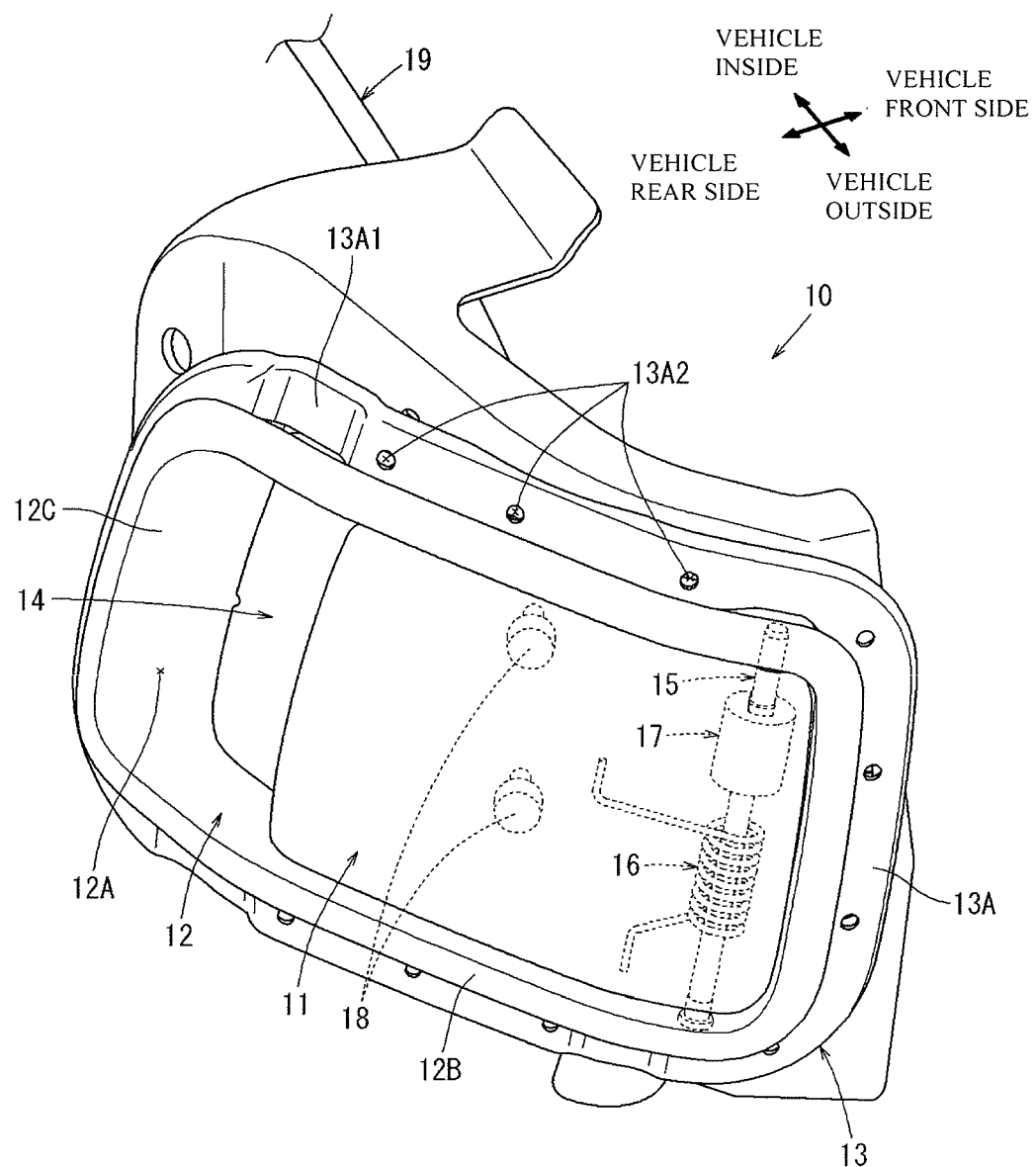
FIG. 6 is a perspective view illustrating a state in which the walk-in lever unit is assembled.
Figure 7:
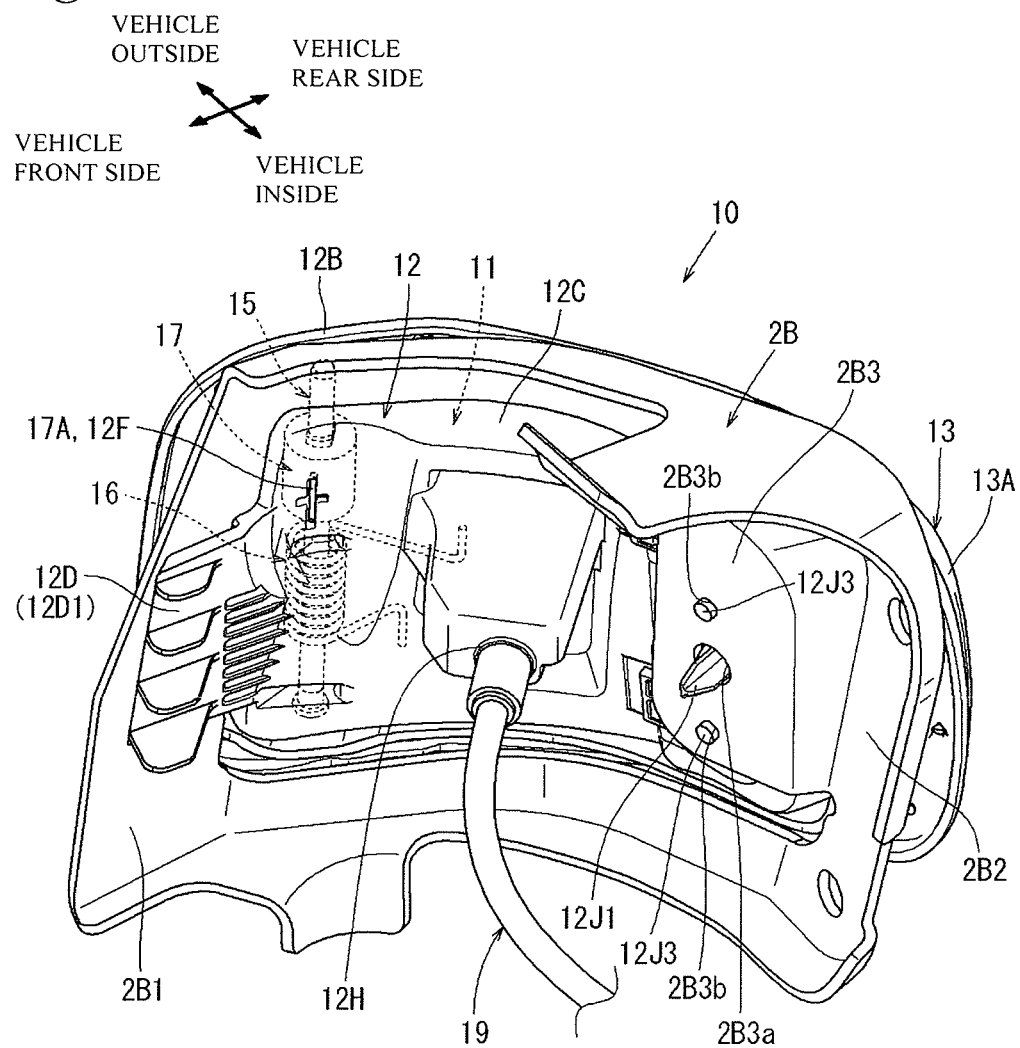
FIG. 7 is a perspective view when

As illustrated in FIGS. 4 and 5, the bracket 2B is formed by pressing a single steel sheet in a curved frame shape. The bracket 2B may have a frame shape which is curved to the vehicle front side toward a region on the vehicle outside, is put to the rear side portion of the shoulder part on the vehicle outside of the back frame 2F, and is integrally assembled by welding. The bracket 2B has a configuration in which a recessed portion 2B1a which is partially recessed to the outer periphery side is formed in an inner peripheral portion at the center in the height direction of the frame plate 2B1 on the vehicle outside facing the space in the frame.

A mounting plate 2B3 is formed at an inner peripheral portion of a frame plate 2B2 that is provided at a side of the bracket 2B toward the vehicle inside. The mounting plate 2B3 is extended from the frame plate 2B2 to be stepped inward toward inside the vehicle seat 1 and further extended toward an inner space of the bracket 2B having a frame shape. The mounting plate 2B3 is formed to extend in a plate shape with which a mounting portion 12J of the bezel 12 to be described later can be brought into surface contact. On the mounting plate 2B3, a fitting hole 2B3a having a round hole shape into which a fitting protrusion 12J1 formed to protrude in the rear surface of the mounting portion 12J of the bezel 12 to be described later can be inserted and two fastening holes 2B3b having a round hole shape to which two screws 12J3 plugged in the mounting portion 12J of the bezel 12 to be described later can be fastened are formed in the height direction.

Details of the walk-in lever unit 10 will be described below in details. As illustrated in FIGS. 4 and 5, the walk-in lever unit 10 includes a rotational operation type operation lever 11, a bezel 12 that pivotally supports the operation lever 11, a frame-shaped backing member 13, a lid cover 14 that is assembled into the bezel 12, a shaft member 15 that serves as a rotation axis of the operation lever 11, a torsion spring 16 that elastically supports and holds the operation lever 11 at an initial position, an oil damper 17 that attenuates movement of the operation lever 11, a cushion rubber 18 that buffers landing of the operation lever 11 at the time of return of the operation lever 11, and a cable 19 that is pulled by the operation of the operation lever 11. The operation lever 11, the bezel 12, the backing member 13, and the lid cover 14 are respectively formed of an injection-molded resin material. The specific configurations of the members will be described below.

The operation lever 11 is formed substantially in a plate shape and the edge portions on the vehicle upper and lower sides extend to have a shape bent to the rear side which is the assembly direction into the bezel 12. Specifically, the edge portions on the vehicle upper and lower sides of the operation lever 11 are formed to extend in a relatively straightly rising-up shape along the shape of the inner peripheral surface of the peripheral wall portions 12C on the vehicle upper and lower sides of the bezel 12 to be described later. As illustrated in FIG. 5, a groove-shaped wire hooking portion 11A to which an end of an inner wire 19B wound off from an outer tube 19A of the cable 19 can be hooked and attached and a claw-shaped spring hooking portion 11B to which an end of the torsion spring 16 can be hooked and attached are formed to protrude in the rear surface of the operation lever 11.

As illustrated in FIGS. 4 and 5, the bezel 12 is formed substantially in a container shape having a depression 12A in which the operation lever 11 can be accommodated. The outer frame 12B protruding in a flange shape to the outer periphery is formed over the entire periphery in the container-shaped peripheral portion of the bezel 12. The outer frame 12B has a shape protruding in a shape which is slightly inclined to the rear side which is the assembly direction into the bracket 2B (see FIGS. 8 and 9). Regarding the peripheral wall portion 12C which is an upright wall portion of the container shape of the bezel 12, the peripheral wall portions 12C on the vehicle inside and outside are formed in a rising-up shape which is inclined to slightly narrow the space therebetween to the rear side which is the assembly direction into the bracket 2B (see FIG. 8). The peripheral portions 12C on the vehicle upper and lower sides of the bezel 12 are formed in a shape relatively straightly rising up to the rear side (see FIG. 9).

An insertion portion 12D protruding to be oblique to the vehicle outside from the outer peripheral surface of the peripheral wall portion 12C to the rear side which is the assembly direction into the bracket 2B is formed on a side portion on the vehicle outside of the bezel 12. The insertion portion 12D is formed in a shape protruding like a clip and including an insertion plate 12D1 inserted to a back side of the frame plate 2B1 on the vehicle outside of the bracket 2B and a pair of upper and lower canopy portions 12D2 inserted to the front side. As illustrated in FIG. 4, on the bottom of the bezel 12, two shaft support portions 12E having an arc surface, which is put to the shaft member 15 from the rear side and which can pivotally support the shaft member 15 so as to be rotatable, at the tip thereof are arranged in the height direction and are formed to protrude.

On the bottom which is arranged in the axial direction along with the shaft support portions 12E of the bezel 12, a slit-shaped locking groove 12F into which a locking protrusion 17A formed on the outer periphery of the oil damper 17 can be inserted and locked in a state in which rotation is stopped is formed. A claw-shaped spring hooking portion 12G to which an end of the torsion spring 16 can be hooked and locked is formed on the bottom of the central region in the seat width direction of the bezel 12. As illustrated in FIG. 5, a groove-shaped tube hooking portion 12H to which an end of the outer tube 19A of the cable 19 can be hooked and locked is formed on the rear surface of the central region in the seat width direction of the bezel 12.

A mounting portion 12J protruding in a plate shape which can be put to the mounting plate 2B3 of the bracket 2B in a surface contact state is formed on the rear surface on the vehicle inside of the bezel 12. A fitting protrusion 12J1 protruding in a rod shape having a tapered tip from the rear surface thereof and two fastening holes 12J2 having a round hole shape into which screws 12J3 can be inserted and plugged on the vehicle upper and lower sides of the fitting protrusion 12J1 are formed in the mounting portion 12J.

As illustrated in FIGS. 4 and 5, on the bottom on the vehicle inside of the bezel 12 having the mounting portion 12J formed thereon, two claw holes 12K into which two plug-in claws 14A formed in an edge on the vehicle outside of the lid cover 14 can be inserted to the vehicle outside are formed in a region closer to the vehicle inside than the mounting portion 12J. A claw hole 12L into which an elastic claw 14B formed to protrude on the rear surface of the edge portion on the vehicle inside of the lid cover 14 can be plugged from the front side and can be locked in a stopped state is formed in a region closer to the vehicle outside than the mounting portion 12J on the bottom of the bezel 12.

The bezel 12 is attached and fixed to the bracket 2B as follows. First, the insertion portion 12D formed to protrude on the side portion on the vehicle outside of the bezel 12 is plugged into the groove region 2B1a of the frame plate 2B1 on the vehicle outside of the bracket 2B such that the frame plate 2B1 is interposed between the insertion plate 12D1 and the canopy portions 12D2. Then, the fitting protrusion 12J1 formed to protrude on the rear surface of the mounting portion 12J of the bezel 12 is plugged into the fitting hole 2B3a formed in the mounting plate 2B3 of the bracket 2B, and the mounting portion 12J of the bezel 12 is disposed on the mounting plate 2B3 of the bracket 2B in a surface contact state. Accordingly, the bezel 12 is locked (temporarily fixed) and held into the bracket 2B in a state in which the bezel 12 is not dropped from the bracket 2B such that the bottom region of the bezel 12 is inserted into the space in the frame of the bracket 2B.

The screws 12J3 are plugged into the two fastening holes 12J2 formed in the mounting portion 12J of the bezel 12 from the front side. At this time, the bezel 12 slightly swings in the turning direction about the fitting protrusion 12J1 fitted into the fitting hole 2B3a of the mounting plate 2B3 of the bracket 2B. By this swing, the two fastening holes 12J2 formed in the mounting portion 12J of the bezel 12 can be matched with the fastening holes 2B3b formed in the mounting plate 2B3 of the bracket 2B. Accordingly, by plugging and fastening the screws 12J3 into the fastening holes 12J2 and 2B3b with this matching, the bezel 12 can be coupled to the mounting plate 2B3 of the bracket 2B in a matched state in which both are matched with each other in position in the rotation direction and the front-rear direction (see FIGS. 6 and 7). In this way, the bezel 12 is attached and fixed to the bracket 2B.

As illustrated in FIGS. 4 and 5, the backing member 13 is formed in a frame shape larger than the peripheral wall portion 12C such that the peripheral wall portion 12C of the bezel 12 passes therethrough. The frame plate of the backing member 13 is formed as the inner frame 13A which is put to the periphery of the penetration hole 2C3 of the back cover 2C from the rear side in a surface contact state as described with reference to FIG. 3. The frame shape of the inner frame 13A protrudes to the outer peripheral side over a range larger than the outer frame 12B of the bezel 12. As illustrated in FIGS. 8 and 9, the outer frame 12B of the bezel 12 is put to the intermediate portion in the inside-outside direction of the frame of the inner frame 13A.

The backing member 13 is insert-molded into the back pad 2P as a unified body in a state in which the inner frame 13A is put to the periphery of the penetration hole 2C3 of the back cover 2C from the rear side in the surface contact state. Accordingly, the periphery of the penetration hole 2C3 of the back cover 2C is directly put to the inner frame 13A of the backing member 13 integrally embedded in the back pad 2P from the rear side and is supported thereby.

As described above, the outer frame 12B of the bezel 12 is put to the intermediate portion in the inside-outside direction of the inner frame 13A. Accordingly, the periphery of the penetration hole 2C3 of the back cover 2C covered with the outer frame 12B of the bezel 12 is supported by the inner frame 13A from the rear side over a range larger than the outer frame 12B of the bezel 12. Even when a force due to pressing with a finger is applied to the periphery of the penetration hole 2C3 of the back cover 2C covered with the outer frame 12B of the bezel 12 from the outside, the periphery of the penetration hole 2C3 of the back cover 2C is strongly supported by the backing member 13 from the rear side and thus a clearance is not formed between the outer frame 12B of the bezel 12 and the periphery of the penetration hole 2C3.

An edge portion on the outer peripheral side of the inner frame 13A extends in a shape rounded and bent to the rear side. Accordingly, the outer peripheral portion of the inner frame 13A is rounded in a shape in which the edge does not rise up. As a result, even when a force due to pressing with a finger or the like is applied to the periphery of the penetration hole 2C3 of the back cover 2C from the outside, the contact can be relaxed and received by the rounded shape of the outer peripheral portion of the inner frame 13A.

As illustrated in FIGS. 3 to 5, depressed portions 13A1 which are partially depressed to the rear side are formed at plural positions in the peripheral direction of the inner frame 13A. As illustrated in FIG. 3, the depressed portions 13A1 are disposed and formed in regions through which the sewed portions 2C2 in which the cover pieces of the back cover 2C are sewed pass. The sewed portions 2C2 pass through the depressions of the depressed portions 13A1, whereby the sewed portions 2C2 protruding to the rear surface of the back cover 2C can be prevented from going over the inner frame 13A to cause partial lifting in the back cover 2C.

Penetration holes 13A2 having a round hole shape penetrating the inner frame 13A in the thickness direction thereof are formed at several positions in the peripheral direction of the inner frame 13A. The penetration holes 13A2 enable the foamed resin material of the back pad 2P to pass therethrough and to impregnate the rear surface (laminated pad layer 2C1) of the back cover 2C to be integrally cured in setting the backing member 13 on the rear surface of the back cover 2C and foam-molding the back pad 2P. By this setting of the penetration holes 13A2, the backing member 13 can retain the back cover 2C in a state in which the inner frame 13A comes in direct contact with the rear surface of the back cover 2C and in a state in which the back cover 2C is in a strong surface contact without departing in the in-plane direction from the inner frame 13A or being peeled off.

As illustrated in FIGS. 4 and 5, the backing member 13 includes an upright wall shaped peripheral wall portion 13B protruding in a shape which is bent from the inner peripheral edge of the inner frame 13A to the rear side. As illustrated in FIGS. 8 and 9, the peripheral wall portion 13B has a rising-up shape which is inclined in a shape having a tapered tip to the protruding rear side. Specifically, the peripheral wall portion 13B has a rising-up shape which is smoothly matched with the outer peripheral shape of the peripheral wall portion 12C of the bezel 12 with the peripheral edge portion 2C4 of the back cover 2C interposed therebetween by causing the peripheral wall portion 12C of the bezel 12 to pass therethrough from the opening of the inner frame 13A.

Since the peripheral wall portion 13B has this shape, the backing member 13 can widely receive the peripheral wall portion 12C of the bezel 12 from the opening side (front side) of the inner frame 13A to guide the plugging thereof and can be held and supported in a state in which the movement is restricted so as not to depart from the bezel 12 in the rear direction which is an off-plane direction of the back cover 2C as well as the right-left direction which is an in-plane direction of the back cover 2C in a state in which the peripheral wall portion 12C of the bezel 12 is put on the peripheral wall portion 13B of the backing member 13 in a partially inclined peripheral surface contact state (see FIG. 8) with the peripheral edge portion 2C4 of the back cover 2C interposed therebetween.

As illustrated in FIG. 3, by causing the peripheral wall portion 12C of the bezel 12 to pass through the space (the penetration hole 2C3 of the back pad 2P) in the inner frame 13A and attaching the bezel 12 to the bracket 2B, the backing member 13 is slightly pressed to the rear side by the outer frame 12B of the bezel 12 with the back cover 2C interposed therebetween. By this pressing, the backing member 13 applies an elastic repulsive force acting from the rear side by the back pad 2P to the back cover 2C from the inner frame 13A from the rear side, and holds and supports the periphery of the penetration hole 2C3 of the back cover 2C which is slightly pressed from the front and rear sides between the outer frame 12B of the bezel 12 and the backing member 13. By the attachment of the bezel 12 to the bracket 2B, the peripheral edge portions 2C4 of the back cover 2C facing the penetration hole 2C3 protruding into the space in the frame of the backing member 13 are held and supported in a state in which the peripheral edge portions 2C4 are bent to be folded on the inner peripheral surface of the peripheral wall portion 13B of the backing member 13 and are pressed and pinched between the peripheral wall portion 12C of the bezel 12 and the peripheral wall portion 13B of the backing member 13.

As illustrated in FIG. 4, the lid cover 14 is formed substantially in a plate shape and the screws 12J3 are screwed to the bottom of the bezel 12 in a state in which the plug-in mounting portion 12J is covered from the front side. Specifically, as illustrated in FIG. 5, plug-in claws 14A protruding from the rear surface thereof to the vehicle outside are formed at two upper and lower positions of the edge portion on the vehicle outside of the lid cover 14. An elastic claw 14B protruding to the rear side and having a hook-like claw at the tip thereof is formed at the center of the rear surface of the edge portion on the vehicle inside of the lid cover 14.

By plugging the plug-in claws 14A into the claw holes 12K formed on the bottom of the bezel 12 and then plugging the elastic claw 14B into the claw hole 12L formed on the bottom of the bezel 12, the lid cover 14 is attached such that the elastic claw 14B comes in contact with the inner peripheral edge portion of the claw hole 12L and is pressed and bent to the vehicle outside and then the claw is hooked on the bottom surface on the depth side of the claw hole 12L by elastic deformation in a state in which the mounting portion 12J of the bezel 12 is covered. Accordingly, by the attachment of the lid cover 14, the heads of the screws 12J3 passing through the mounting portion 12J of the bezel 12 from the front side can be hidden from the outside and it is thus possible to mount the bezel 12 with good appearance (see FIG. 6).

As illustrated in FIGS. 4 and 5, the shaft member 15 is plugged and attached in a state in which the shaft member 15 passes through the peripheral wall portion 12C in the vehicle outside region of the bezel 12 so as to be plugged in the depression 12A of the bezel 12 after the operation lever 11 is set in the depression 12A. By insertion of the shaft member 15, the operation lever 11 is pivotally supported to rotate between a state in which the operation lever 11 is inside the depression 12A to be flush with the bezel 12 and a state in which the operation lever 11 rises outward and protrudes to the vehicle rear side from the depression 12A of the bezel 12 with the edge portion on the vehicle outside as an axis center.

The shaft member 15 is inserted into the bezel 12 through the peripheral wall portions 12C on the vehicle upside and the vehicle downside and is rotatably supported by the peripheral wall portions 12C on the vehicle upside and the vehicle downside, and intermediate portions thereof are put on and rotatably supported by the shaft support portions 12E formed on the bottom of the bezel 12 from the rear side. The shaft member 15 is coupled to the operation lever 11 so as to form a unified body in the rotation direction. Accordingly, the shaft member 15 is configured to pivotally rotate with respect to the bezel 12 as a unified body with the operation lever 11.

The torsion spring 16 is disposed such that the shaft member 15 passes through a winding portion at the center thereof. In the torsion spring 16, an end on the vehicle inside is hooked on the spring hooking portion 12G formed in the bezel 12 and is retained as a unified body in the rotation direction, and an end on the vehicle outside is hooked on the spring hooking portion 11B formed on the rear surface of the operation lever 11 and is retained as a unified body in the rotation direction. The torsion spring 16 holds and supports the operation lever 11 at the initial position at which the operation lever 11 is put in the depression 12A of the bezel 12 using the spring force thereof.

The oil damper 17 has a cylindrical shape, the shaft member 15 passes through the cylinder thereof, and a rotor therein is connected to the shaft member 15 as a unified body in the rotation direction. In the oil damper 17, a locking protrusion 17A protruding to extend in a stripe shape in the axial direction is formed on the cylindrical portion on the outer periphery side which is configured to rotate with respect to the rotor therein, and the cylindrical portion on the outer periphery side is coupled to the bezel 12 as a unified body by fitting the locking protrusion 17A to the locking groove 12F formed on the bottom of the bezel 12.

The oil damper 17 serves to dampen the axial rotation of the rotor by the use of viscous resistance of oil filled therebetween by axially rotating the rotor in the cylindrical portion on the outer periphery side. By the oil damper 17, when the operation lever 11 is returned to the initial position by the elastic repulsive force of the torsion spring 16 after being operated, the operation lever is not returned with great resilient strength but is returned with good quality while the speed is slowly dampened.

Two cushion rubbers 18 are arranged in the height direction on the bottom of the central region in the seat width direction of the bezel 12. The cushion rubbers 18 are elastically pressed against the rear surface of the operation lever 11 when the operation lever 11 is located at the initial position before being operated. When the operation lever 11 is located at the initial position before being operated, the operation lever 11 is retained by the cushion rubbers 18 in a state in which the operation lever is elastically supported from the rear side and occurrence of clattering due to vibration of the vehicle or noise due to interference with another member such as the bezel 12 is suppressed. When the operation lever 11 is returned to the initial position by the elastic repulsive force of the torsion spring 16 after being operated, the operation lever 11 is elastically softly received to slowly land at the initial position.

The cable 19 has a dual structure in which a linear inner wire 19B having flexibility is inserted into a tubular outer tube 19A having flexibility. An end of the cable 19 is connected to the walk-in lever unit 10 and the other end thereof is connected to a release mechanism (not illustrated) that releases the fixed state of the backrest angle of the seat back 2. Specifically, as illustrated in FIG. 5, an end of the outer tube 19A at one end of the cable 19 is integrally hooked to a tube hooking portion 12H formed on the rear surface of the bezel 12 and an end of the inner wire 19B wound off from the end of the outer tube 19A is integrally hooked to a wire hooking portion 11A formed on the rear surface of the operation lever 11.

The cable 19 is pulled such that the inner wire 19B at one end thereof is further wound off from the outer tube 19A by operating the operation lever 11, a degree of operational movement thereof is transmitted to the other end, and the release mechanism (not illustrated) performs a releasing operation.

Summarizing the above-mentioned configuration, the seat 1 (vehicle seat) according to the embodiment has the following configuration. That is, the seat 1 includes the back pad 2P (seat pad), the back cover 2C (seat cover) with which the surface of the back pad 2P is covered, the back frame 2F (seat frame) that supports the back pad 2P from the rear side, and the walk-in lever unit 10 (assembly component) that is attached to the back frame 2F through the penetration hole 2C3 formed in the back cover 2C. The walk-in lever unit 10 includes the bezel 12 and the backing member 13. The bezel 12 includes the outer frame 12B that is fixed to the back frame 2F through the penetration hole 2C3 from the front side and is put on the periphery of the penetration hole 2C3 from the front side. The backing member 13 includes the inner frame 13A that is put on the periphery of the penetration hole 2C3 from the rear side and is integrally disposed in the back pad 2P by insert-molding.

In this way, by integrally disposing the backing member 13 in the back pad 2P by insert-molding, the assembly of the walk-in lever unit 10 into the back frame 2F can be completed by only assembly of the bezel 12. With this simple assembly, the bezel 12 and the backing member 13 are put on the periphery of the penetration hole 2C3 of the back cover 2C from the front side and the rear side such the penetration hole 2C3 is neatly covered.

The back pad 2P is integrally formed in the rear surface of the back cover 2C by foam-molding. The backing member 13 comes in contact with the bezel 12 from the outer periphery side thereof to restrict the movement in the in-plane direction of the back cover 2C with respect to the bezel 12. By employing this configuration, the back cover 2C is made not to depart in the in-plane direction with respect to the bezel 12 with simple assembly and the periphery of the penetration hole 2C3 is neatly covered without enlarging the outer frame 12B of the bezel 12 or the inner frame 13A of the backing member 13.

The penetration hole 13A2 is formed in the inner frame 13A of the backing member 13, the periphery of the penetration hole 2C3 is impregnated with the foamed resin material of the back pad 2P through the penetration hole 13A2, and the foamed resin material is cured. By employing this configuration, the inner frame 13A of the backing member 13 can be fixed in a state in which it is integrally put on the periphery of the penetration hole 2C3. Accordingly, the periphery of the penetration hole 2C3 can be neatly covered with the inner frame 13A of the backing member 13.

The backing member 13 is formed in a shape in which the opening is obliquely enlarged to the front side on which the bezel 12 is received. The bezel 12 has a shape including the inclined outer peripheral surface (the peripheral wall portions 12C on the vehicle outside and the vehicle inside) matched with the inclined peripheral surface (the peripheral wall portion 13B) of the backing member 13, and the bezel 12 is fitted to the backing member 13 in a state in which a part (the peripheral wall portion 12C on the vehicle outside and the vehicle inside) is put on the backing member from the front side in an inclined peripheral surface contact state. By employing this configuration, since the opening on the front side through which the bezel 12 passes is formed broad by the backing member 13, it is possible to simplify the operation of causing the bezel 12 to pass through the penetration hole 2C3. By causing the bezel 12 to pass through the penetration hole 2C3, the bezel 12 can be put on the backing member 13 from the front side in the inclined peripheral surface contact state, and the backing member can be fitted to the bezel 12 so as to make it difficult to be deviated in position.

While the embodiment of the invention has been described above as an example, the invention can be modified in various forms in addition to the above-mentioned example. For example, the "vehicle seat" according to the invention can be applied to a seat other than the right seat of a vehicle or a seat such as a driver seat other than seats in the second row, and can also be widely applied to a seat of a vehicle such as a train other than an automobile or a seat of various vehicles such as an aircraft or a ship.

The "assembly component" is not limited to the walk-in lever unit described in the above-mentioned embodiment, but can employ various members which are assembled into the seat frame through a penetration hole formed in the seat cover. Specifically, examples thereof include an operation strap wound off from the bezel or a rod-like striker which is integrally cross-linked in a depression of the bezel. The bezel or the backing member is not limited to a rectangular shape, but may be formed in various other forms such as a circular shape, an elliptical shape, and a triangular shape.

The configuration of the invention can be applied to various parts constituting a seat, such as a seat cushion, a headrest, or an ottoman in addition to the seat back. The backing member may not have a function of coming in contact with the bezel from the outer periphery side and regulating movement in the in-plane direction of the seat cover with respect to the bezel. The backing member is put on the periphery of the penetration hole of the seat cover from the rear side and is integrally formed in the seat pad by insert-molding, thereby simplifying assembly of the assembly component into the seat frame as a whole.

By forming the outer peripheral edge of the inner frame in a depressed shape by forming the outer peripheral edge of the inner frame in a ruffled shape or the like, the penetration hole formed in the inner frame of the backing member may cause the foamed resin material of the seat pad to impregnate the periphery of the penetration hole of the seat cover from the depression. The seat cover may be an independent member which is covered later after the seat pad is foamed and molded.

What is claimed is:
1. A vehicle seat comprising:
a seat pad;
a seat cover that covers a surface of the seat pad;
a seat frame that supports the seat pad from an inner side the seat pad; and
an assembly component that is assembled into the seat frame through a penetration hole provided in the seat cover, wherein
the assembly component is provided with:
a bezel that is fixed to the seat frame through the penetration hole from an outer side of the penetration hole, the bezel including an outer frame arranged to cover a periphery of the penetration hole from the outer side of the penetration hole; and a backing member that includes an inner frame arranged to cover the periphery of the penetration hole from an inner side of the penetration hole, the backing member being insert-molded in the seat pad such that a periphery of a penetration hole of the inner frame is impregnated with a cured foamed resin material of the seat pad that is provided through the penetration hole of the inner frame.

2. The vehicle seat according to claim 1, wherein
the seat pad is foamed and molded in an inner portion of the seat cover as a unified body, and
the backing member has an outer periphery that fits with the bezel to restrict movement of the seat cover with respect to the bezel in an in-plane direction.

3. The vehicle seat according to claim 1, wherein
the backing member defines an opening that is inclined toward the outer side of the penetration hole at which the bezel is fitted,
the bezel has an inclined outer peripheral surface matched with an inclined inner peripheral surface of the backing member, and
the bezel is fitted with the backing member such that the inclined outer peripheral surface of the bezel is matched with the inclined inner peripheral surface of the backing member from the outer side of the penetration hole.

4. The vehicle seat according to claim 1, wherein
the backing member is insert-molded in the seat pad so as to define a unified body with the seat pad.

5. The vehicle seat according to claim 1 further comprising a bracket that is fixed to the seat frame, wherein
the bezel is attached to the bracket and is fixed to the seat frame via the bracket.

6. The vehicle seat according to claim 5, wherein
the bracket is provided with a mounting plate that is stepped inward toward an inside of the vehicle seat and extends toward an inner space of the bracket, and
the bezel is provided with a mounting portion that is attached to the mounting plate of the bracket such that the mounting portion is in surface contact with the mounting plate.

7. The vehicle seat according to claim 5, wherein
the bracket is provided with a frame plate, and
the bezel is provided with an insertion portion having an insertion plate that is inserted to a back side of the frame plate and a canopy portion that is inserted to a front side of the frame plate.

* * * * *